(12) United States Patent
Johnson et al.

(10) Patent No.: US 11,002,422 B1
(45) Date of Patent: May 11, 2021

(54) VEHICLE LAMP WITH REFLASHING ACCESS AND METHOD OF FLASHING A VEHICLE LAMP

(71) Applicant: Ford Global Technologies, LLC, Dearborn, MI (US)

(72) Inventors: Aaron Bradley Johnson, Allen Park, MI (US); Luciano Lukacs, Plymouth, MI (US); Melvin Kyler, Redford, MI (US); Stuart C. Salter, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/774,346

(22) Filed: Jan. 28, 2020

(51) Int. Cl.

| F21S 45/30 | (2018.01) |
| F21S 41/19 | (2018.01) |
| B60Q 1/00 | (2006.01) |
| H05B 47/165 | (2020.01) |
| F21S 43/19 | (2018.01) |

(52) U.S. Cl.
CPC ............ *F21S 45/30* (2018.01); *B60Q 1/0094* (2013.01); *F21S 41/192* (2018.01); *F21S 43/195* (2018.01); *H05B 47/165* (2020.01)

(58) Field of Classification Search
CPC ............................... F21V 23/06; B60Q 1/0094
See application file for complete search history.

(56) References Cited

U.S. PATENT DOCUMENTS

| 10,436,412 | B2 | 10/2019 | Lee | |
| 2005/0047167 | A1* | 3/2005 | Pederson | F21S 43/14 |
| | | | | 362/542 |
| 2014/0379225 | A1 | 12/2014 | Nakanishi | |
| 2016/0227616 | A1* | 8/2016 | Lee | H05B 45/37 |
| 2018/0031203 | A1* | 2/2018 | Lee | F21S 45/10 |
| 2018/0319326 | A1* | 11/2018 | Daylong | H05B 47/19 |
| 2019/0359118 | A1* | 11/2019 | Spenner | B60Q 1/076 |
| 2020/0049326 | A1* | 2/2020 | Brown | F21V 15/015 |

FOREIGN PATENT DOCUMENTS

DE           102014010650 A1     8/2015

* cited by examiner

*Primary Examiner* — Alexander K Garlen
(74) *Attorney, Agent, or Firm* — David Coppiellie; Carlson, Gaskey & Olds, P.C.

(57) ABSTRACT

A vehicle lamp assembly includes, a lamp housing defining an interior cavity and an exterior surface, a circuit board disposed within the interior cavity, the circuit board including a memory device, microprocessor and a connector for establishing a communication link with the memory device and the microprocessor. A vent opening within the lamp housing aligned with the connector on the circuit board and a permeable membrane is attached over the vent opening. Alignment of the vent opening with the connector provides access for reflashing upon removal of the permeable membrane.

20 Claims, 5 Drawing Sheets

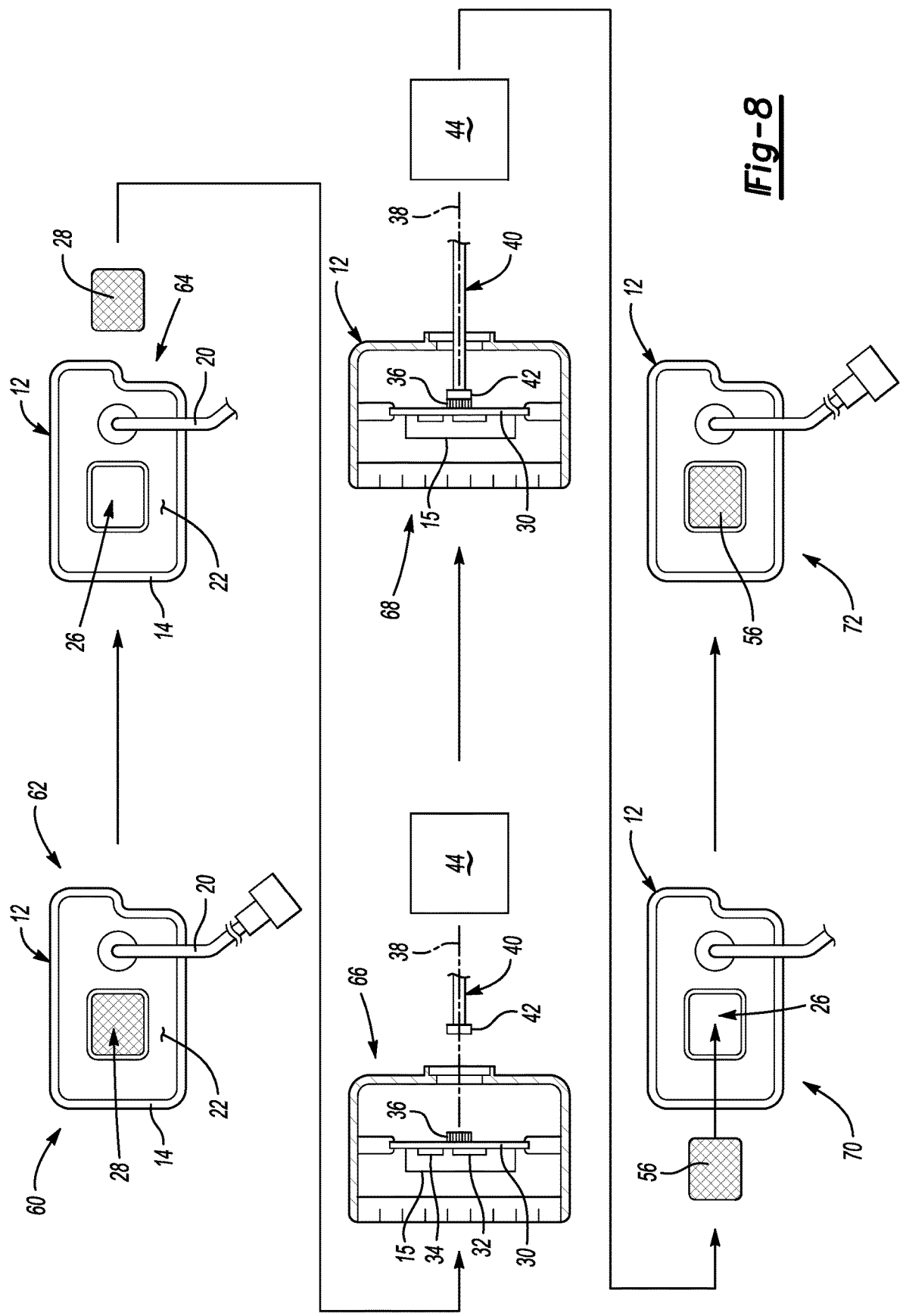

United States Patent

VEHICLE LAMP WITH REFLASHING ACCESS AND METHOD OF FLASHING A VEHICLE LAMP

TECHNICAL FIELD

This disclosure relates to a vehicle lamp with access features that provide for reflashing of an assembled vehicle lamp.

BACKGROUND

Lighting components are including additional functions and may include software stored within a computing device controlling operation of the lamp. The computing device is typically supported on a circuit board assembled into the lamp. Vehicle lamps are sealed in a manner that prevents moisture from penetrating interior cavities. The circuit board is assembled into such an interior cavity and is therefore not easily accessible once the lamp is installed on the vehicle. The limited accessibility of the circuit board limits possible reprogramming and updating of software stored within the lamp.

SUMMARY

A vehicle lamp assembly according to an exemplary aspect of the present disclosure includes, among other possible things, a lamp housing defining an interior cavity and an exterior surface and a circuit board disposed within the interior cavity. The circuit board includes a memory device, microprocessor and a connector for establishing a communication link with the memory device and the microprocessor. A vent opening within the lamp housing is aligned with the connector on the circuit board, and a permeable membrane attached over the vent opening.

In a further non-limiting embodiment of the foregoing lamp assembly, the permeable membrane is applied to the exterior surface of the lamp housing.

In a further non-limiting embodiment of any of the foregoing lamp assemblies, a raised rib is disposed about the vent opening on the exterior surface of the light housing and the permeable membrane is assembled to an area within the raised rib on the exterior surface.

In a further non-limiting embodiment of any of the foregoing lamp assemblies, the vent opening is disposed about an axis and on an exterior surface of the lamp housing and the connector is disposed along the axis.

In a further non-limiting embodiment of any of the foregoing lamp assemblies, the connector is disposed transverse to the axis extending through the vent opening.

In a further non-limiting embodiment of any of the foregoing lamp assemblies, the connector comprises a plurality of pins that extend from the circuit board, the pins extending from the circuit board along the axis.

In a further non-limiting embodiment of any of the foregoing lamp assemblies, the vent opening is one of a rectilinear shape or a curvilinear shape.

In a further non-limiting embodiment of any of the foregoing lamp assemblies, the vent opening is asymmetrical about the axis.

In a further non-limiting embodiment of any of the foregoing lamp assemblies, the vent opening is at least as large as the connector.

A process for reflashing a vehicle lamp assembly according to another exemplary aspect of the present disclosure includes, among other possible things, extending a reflashing tool through a vent opening formed in a lamp housing, connecting the reflashing tool to the connector on a circuit board disposed within the lamp housing, reflashing a controller on the circuit board through a communication link established through the connection of the reflashing tool and the connector, removing the reflashing tool upon completion of the reflashing and assembling a permeable membrane over the vent opening.

A further non-limiting embodiment of the foregoing process includes removing an originally installed first permeable membrane disposed over the vent opening of the lamp housing prior to extending the reflashing tool through the vent opening.

In a further non-limiting embodiment of any of the foregoing processes, assembly of the permeable membrane over the vent opening comprises adhering the vent opening to an exterior surface of the light housing.

A further non-limiting embodiment of any of the foregoing processes includes assembling the lamp housing to include the vent opening disposed about an axis and assembling the circuit board into the lamp housing such that the connector on the circuit board is disposed along the axis.

In a further non-limiting embodiment of any of the foregoing processes, assembly of the circuit board into the lamp housing includes assembling the connector to be transverse to the axis.

In a further non-limiting embodiment of any of the foregoing processes, assembling the lamp housing to include the vent opening disposed about the axis further comprises forming the vent opening to be one of a rectilinear shape or a curvilinear shape.

In a further non-limiting embodiment of any of the foregoing processes, assembling the lamp housing to include the vent opening disposed about the axis further comprises forming the vent opening to be asymmetrical about the axis.

In a further non-limiting embodiment of any of the foregoing processes, wherein a diagnostic of lamp operation is performed prior to reflashing the controller.

In a further non-limiting embodiment of any of the foregoing processes, reflashing the controller comprises reprogramming functions of the lamp assembly.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 8 is a schematic view of a process of reflashing programming a vehicle lamp assembly.

DETAILED DESCRIPTION

Figure 1:
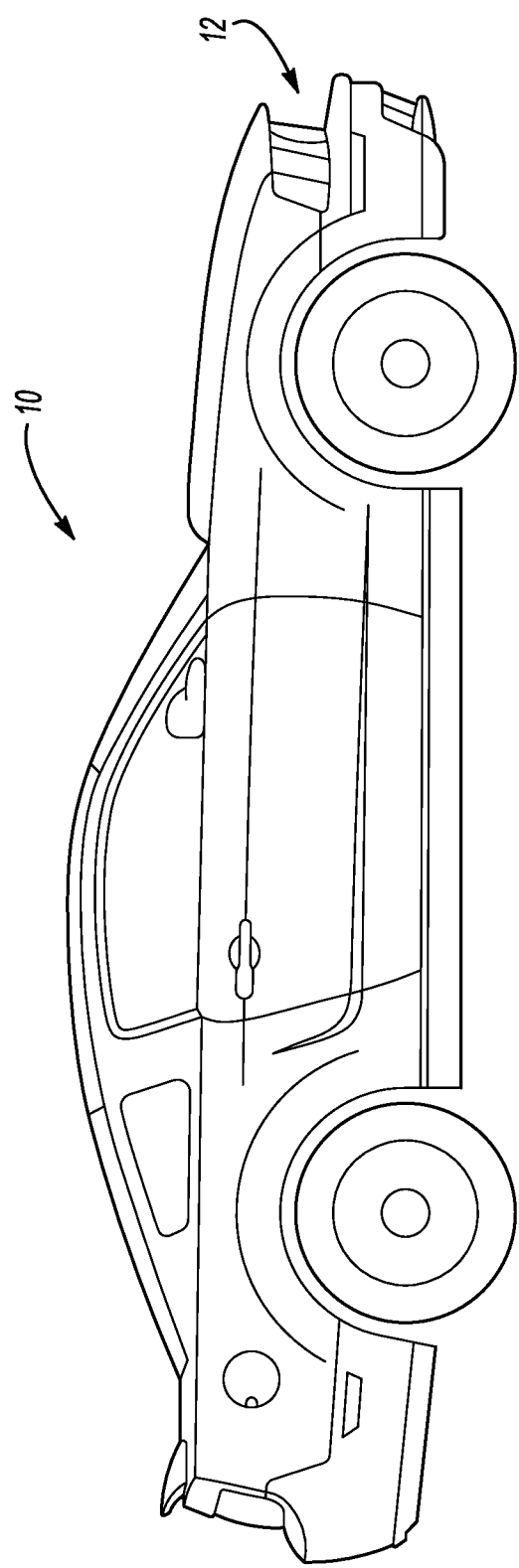
FIG. 1 is a schematic view of a vehicle including a lamp assembly with features enabling reflashing programming.
Figure 2:
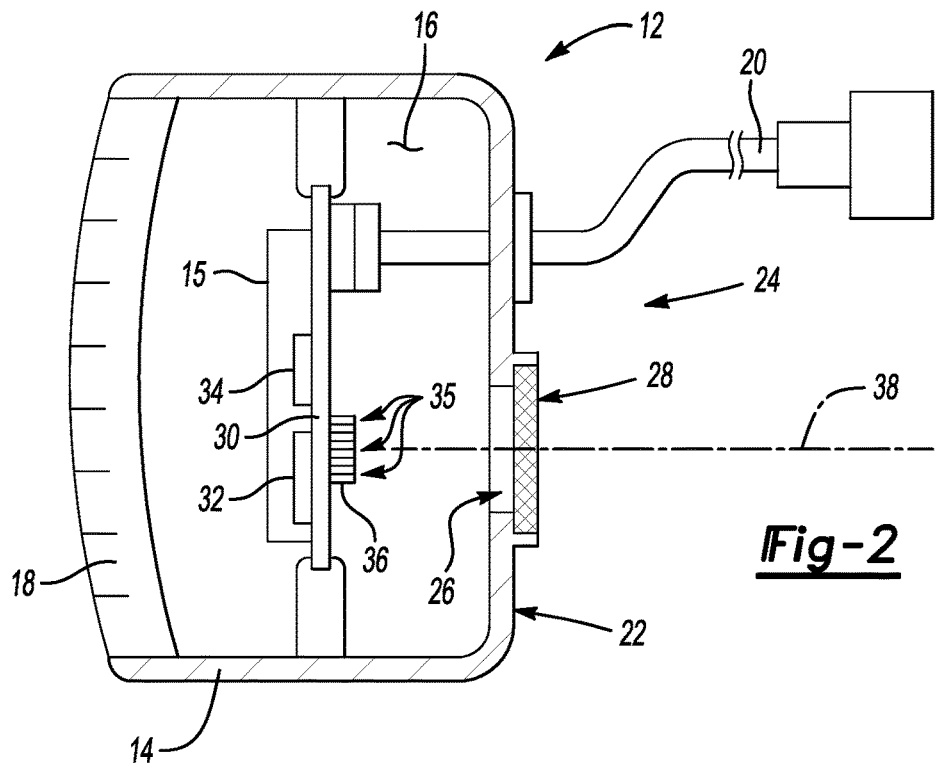
FIG. 2 is a sectional view of an example lamp assembly.
Figure 3:
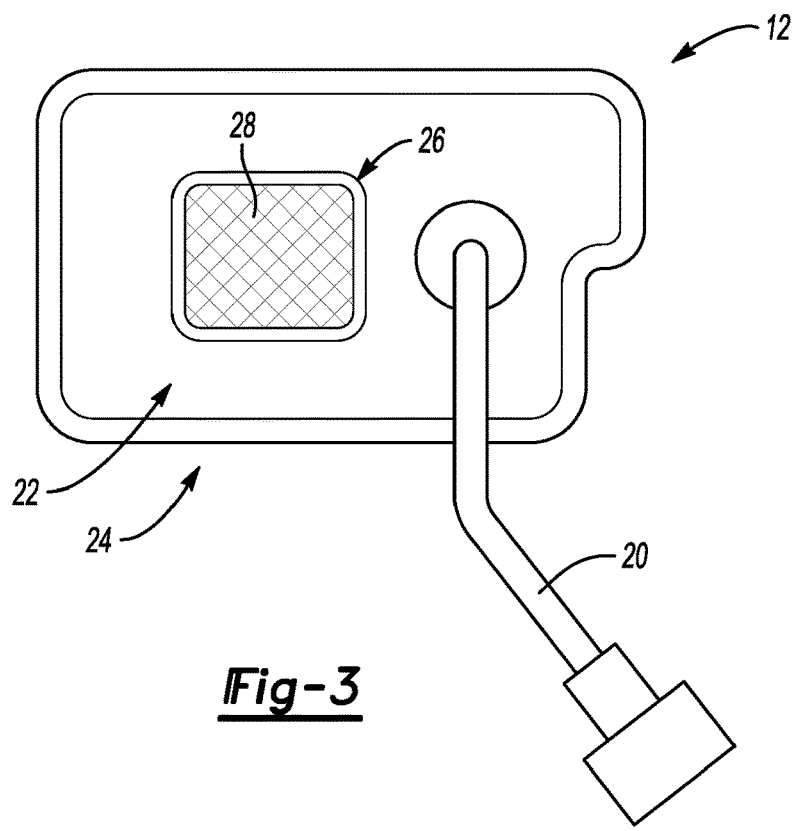
FIG. 3 is a back view of the example lamp assembly.

Referring to FIGS. 1, 2 and 3, a vehicle 10 includes at least one lamp assembly 12. The lamp assembly 12 includes a light source 15 and a lens 18 supported within a lamp housing 14. The example light source 15 maybe any lighting device including an LED, bulb, OLED and/or QLED. In one disclosed example, the lamp assembly 12 is a vehicle headlamp. However, any vehicle lamp assembly such as for example, a fog lamp, taillight or any other lamp with a programmable circuit board that can be reflashed will benefit from and is within the scope and contemplation of this disclosure.

Vehicle lamp assemblies 12 are increasingly incorporating complex features that are governed by software stored in a memory 34 and executed by a controller 32 mounted on a circuit board 30. The controller 32 and memory 34 are isolated from the overall vehicle system and therefore software upgrades and/or fixes are not updatable through the vehicle control system. Instead, updates and upgrades must be implemented by direct reflashing to update software, troubleshoot failures and/or reprogram the lamp assembly 12. Reprogramming provides for a lamp assembly to change functional behavior so the same light assembly can be sold in different markets with different behavioral requirements. Moreover, reflashing of a lamp assembly may reduce warranty costs and potential scraping of a lamp assembly.

The example headlamp assembly 12 includes features that enable reflashing programming without adding additional openings into the lamp housing 14. Any opening within a lamp assembly is sealed. Additional openings complicate assembly, potentially allow heat and moisture ingress and adds cost. The example headlamp assembly 12 includes a vent opening 26 that is covered by a permeable membrane 28. The permeable membrane 28 allows moisture to exit an interior cavity 16 of the lamp housing 14 and blocks moisture and contaminants from entering the cavity 16.

The example lamp assembly 12 includes the circuit board 30 that is supported within the cavity 16 and arranged proximate the vent opening 26. The circuit board 30 includes a controller 32, memory device 34 and the light source 15 as well as other features that are not shown in detail. The circuit board 30 includes a connection to a power cable 20 that communicates power to the lamp assembly 12. The circuit board 30 includes a connector 36 that is aligned along an axis 38. The axis 38 is disposed through the vent opening 26 to facilitate access to the connector 36 by a reflashing tool. The permeable membrane 28 is installed over the vent opening 26 during initial assembly of the lamp assembly 12.

The power cable 20 and the vent opening 26 are shown on a back side 24 of the lamp assembly 12. However, the vent opening 26 may be provided on any surface of the lamp assembly 12 as needed to align with the vent opening 26. Moreover, the location of the vent opening is determined based on an analysis to eliminate moisture from within the lamp assembly 12. The vent opening 26 is sized to both provide sufficient area required to properly vent moisture from the cavity 16 and to accommodate the size of a reflashing tool as well as ingress and egress from the lamp assembly 12.

Figure 4:
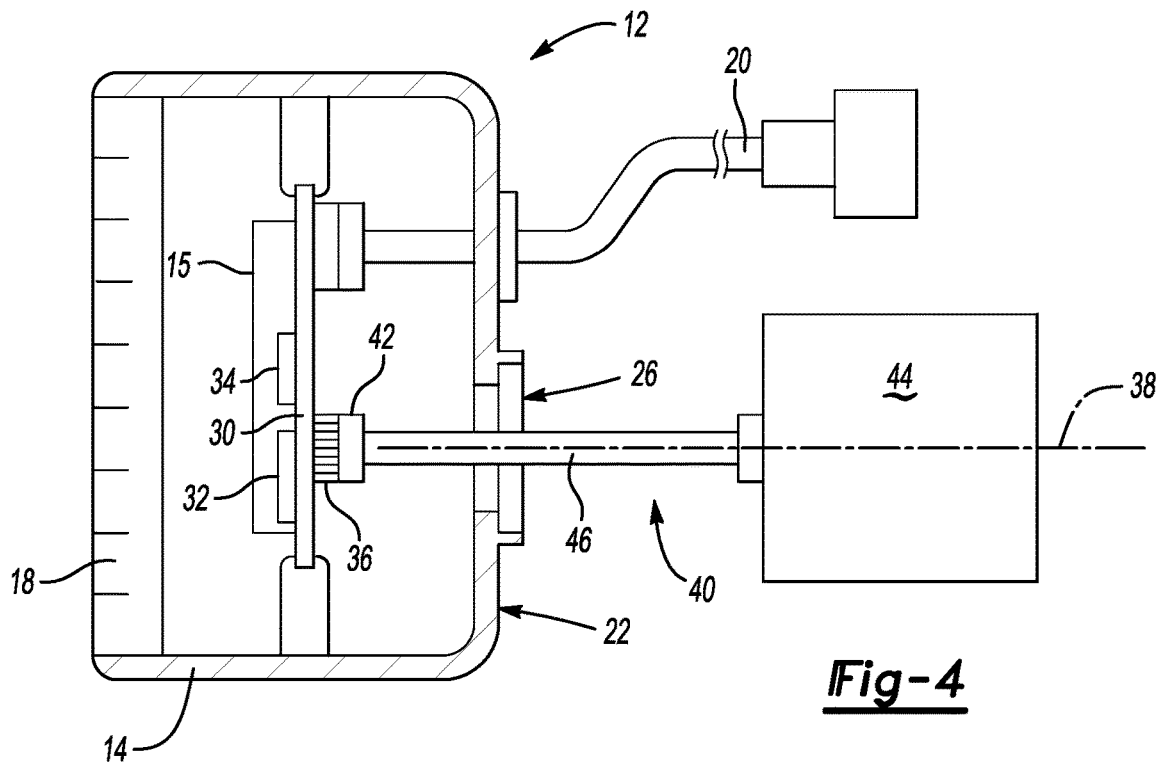
FIG. 4 is a sectional view of an example reflashing tool connected to the example lamp assembly.

Referring to FIG. 4, the example lamp assembly 12 is shown with a reflashing tool 40 extending into the cavity 16 and interfaced with the connector 36 on the circuit board 30. The example reflashing tool 40 includes a cable 46 and a connector 42. The connector 42 is configured to attach to the connector 36 on the circuit board 30 within the cavity 16. In this disclosed example, the circuit board 30 is arranged transverse to the axis 38. Accordingly, the connector 36 is also orientated transverse to the axis and thereby parallel to the vent opening 26. The relative orientation and alignment between the vent opening 26 and the connector 36 enable the reflashing tool 40 to be received within the cavity 16 without interference and stress on the connector 36.

In one disclosed example, the connector 36 includes a plurality of upward extending pins commonly referred to as a stick header. However, the connector 36 may be any connector configuration that enables coupling to the reflashing tool 40. The reflashing tool 40 further includes a computing device 44 that communicates with the controller 32 to perform reflashing.

The example reprogramming method is commonly referred to as reflashing. However, any programming method is within the contemplation and scope of this disclosure. Moreover, the access provided the alignment between the connector 36 and the vent opening 26 may be utilized for initial programming in addition to updating and reflashing of the example lamp assembly 12.

Figure 5:
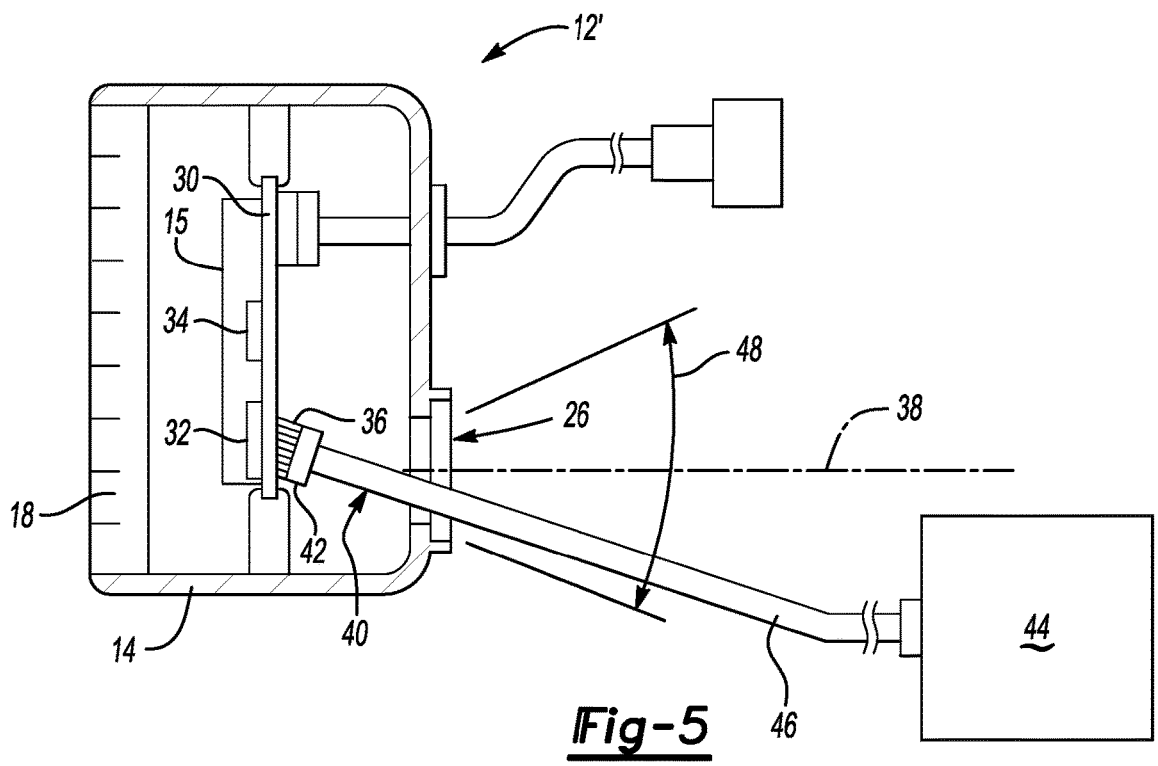
FIG. 5 is a sectional view of another example lamp assembly embodiment.

Referring to FIG. 5, another example lamp assembly 12' is shown with the circuit board 30 disposed at an angle relative to the vent opening 26. Accordingly, the connector 36 is angled relative to the axis 38 extending through the center of the vent opening 26. The reflashing tool 40 is thereby extended through the vent opening at an angle that is within a range of angles about the axis indicated by arrow 48. The connector 36 is not required to be transverse to the axis and parallel to the vent opening 26 to enable access. However, the relative position between the connector 36 the vent opening 26 enables insertion and ready access within the angular range indicated at 48.

Figure 6:
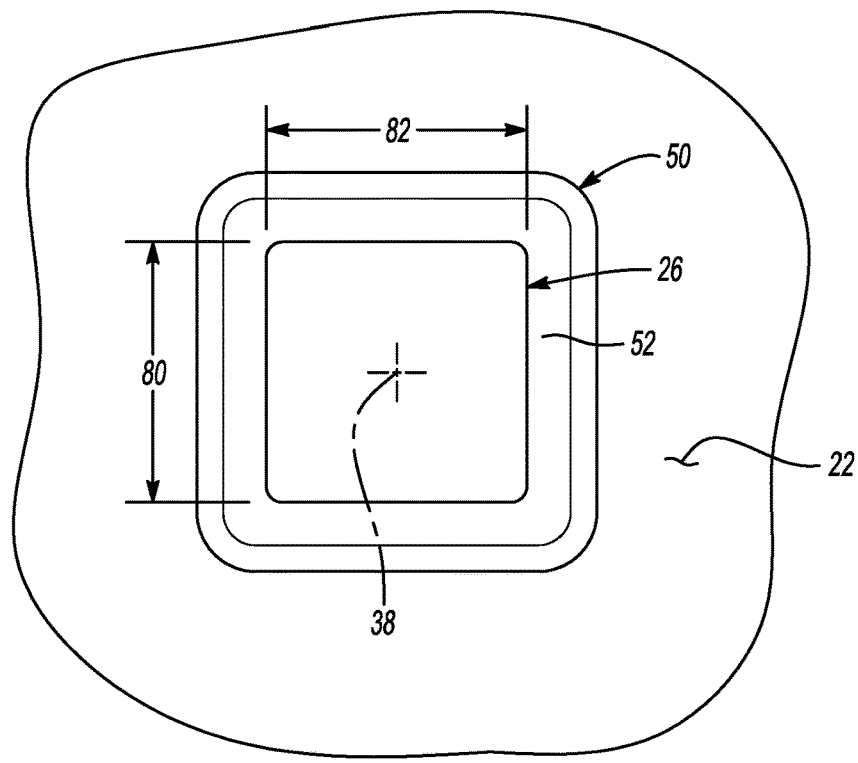
FIG. 6 is an enlarged view of an example uncovered vent opening.
Figure 7:
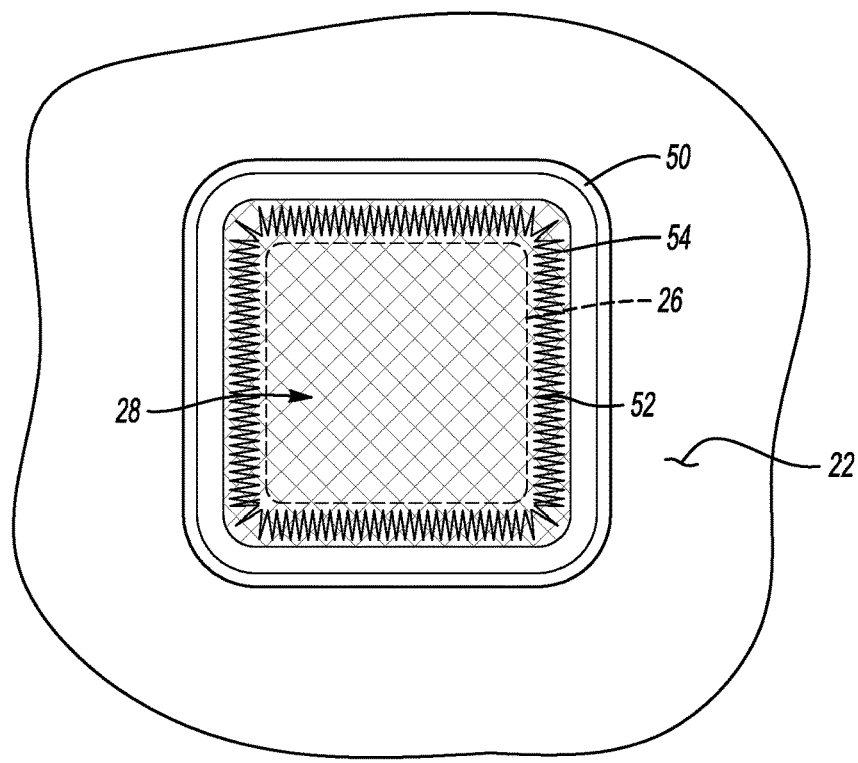
FIG. 7 is an enlarged view of a recovered vent opening.

Referring to FIGS. 6 and 7 with continued reference to FIG. 4, the example vent opening 26 is shown in an enlarged view. The example vent opening 26 is rectangular shaped and centered about the axis 38. The vent opening 26 is surrounded by a rib 50 that is spaced apart from edges of the opening 26. An area 52 between edges of the opening 26 and the rib 50 provides a surface for adhering the membrane 28. In one example embodiment, an adhesive 54 is applied to the area 52 to secure the membrane 28 to the exterior surface 22 of the housing 14. As appreciated, the membrane 28 may be secured about the vent opening 26 by other means within the scope and contemplation of this disclosure.

The example vent opening 26 includes a length 80 and width 82 that define a total vent area. The size of the vent opening 26 is provided based on the venting requirement of the individual lamp assembly 12 and the size of the connector that is receives through the vent opening 26. Moreover, although the example vent opening is rectangular shaped, other rectilinear and asymmetric shapes that provide the required vent area and enable insertion of a connector could be utilized within the contemplation and scope of this disclosure. Moreover, the vent opening 26 may be any shape that provides a predefined area for venting along with providing access for a reflashing tool is within the contemplation and scope of this disclosure.

Referring to FIG. 8, an example method of reflashing a lamp assembly 12 is schematically shown and indicated at 60. As indicated at 62, the example lamp assembly 12 is assembled and includes a membrane 28 applied over a vent opening 26. The membrane 28 is applied at initial assembly. The lamp assembly 12 is also initially programmed to operate according to instructions stored in a memory device 34 and executed by a controller 32 mounted to a circuit board 30 with the assembly 12. In this example, it is desired to perform software updates, trouble-shoot failures, and/or reprogram the lamp assembly 12.

The example lamp assembly 12 may or may not need to be removed from a vehicle 10 to perform the reflashing. Moreover, the lamp assembly 12, may be part of a batch of lamp assemblies that may not have been installed within a vehicle but require updating or reflashing.

In an initial preparation step indicated at 64, the existing membrane 28 is removed from the lamp assembly 12. As appreciated, the existing membrane 28 may be the originally installed membrane and/or a previously installed membrane that was installed after a prior reprogramming. Removal of the existing membrane 28 results in destruction of that membrane 28 such that it is not saved for reuse.

Once the membrane 28 is removed, the vent opening 26 is clear and a reflashing tool 40 may be coupled to a connector 36 as is indicated at 66. The example reflashing tool 40 includes a connector 42 disposed at the end of cable 46. The cable 46 maybe sufficiently rigid to enable insertion along the axis 38 into the cavity 16 and coupling between connectors 42, 36. As appreciated, although a straight in coupling is illustrated, the circuit board 30 and connector 36 may be arranged at an angle or other orientation that requires an angular insertion of the reflashing tool 40. The example vent opening 26 is of a size and orientation relative to the connector 36 that enables such a coupling.

Once the connection is made between the reflashing tool 40 and the connector 36, the reflashing process is performed as indicated at 68. The reflashing process is performed according to known and well understood programming. The specifics of the programming process may include an initial diagnostic of the lamp assembly followed by automatic reflashing. Upon completion of the reflashing and any diagnostic activity indicating a successful reprogramming, the programming tool 40 is disconnected and removed.

Once the reflashing tool 40 is removed, the vent opening 26 is recovered with a new membrane 56 as indicated at 70. The new membrane 56 may be applied with adhesive or by any other means that provide a desired seal. The new membrane 56 provides for the one-way transference of moisture out of the cavity 16 while preventing moisture flow into the cavity 16.

The reflashed and resealed lamp assembly 12 indicated at 72 is then ready for reassembly into a vehicle 10 for operation according to the new programming.

Accordingly, the example lamp assembly 12 and process provides for reflashing of previously assembled lamps without additional openings and/or complete disassembly by aligning a vent opening with a connector on a circuit board within the light assembly.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle lamp assembly comprising:
    a lamp housing defining an interior cavity and an exterior surface;
    a circuit board disposed within the interior cavity, the circuit board including a memory device, microprocessor and a connector for establishing a communication link with the memory device and the microprocessor;
    a vent opening within the lamp housing aligned with the connector on the circuit board, wherein the vent opening is disposed about an axis on the exterior surface of the lamp housing and the connector is disposed on the axis; and
    a permeable membrane attached over the vent opening.

2. The vehicle lamp assembly as recited in claim 1, wherein the permeable membrane is applied to the exterior surface of the lamp housing.

3. The vehicle lamp assembly as recited in claim 2, including a raised rib disposed about the vent opening on the exterior surface of the light housing and the permeable membrane is assembled to an area within the raised rib on the exterior surface.

4. The vehicle lamp assembly as recited in claim 1, wherein the connector is disposed transverse to the axis extending through the vent opening.

5. The vehicle lamp assembly as recited in claim 4, wherein the connector comprises a plurality of pins that extend from the circuit board, the pins extending from the circuit board along the axis.

6. The vehicle lamp assembly as recited in claim 1, wherein the vent opening is one of a rectilinear shape or a curvilinear shape.

7. The vehicle lamp assembly as recited in claim 1, wherein the vent opening is asymmetrical about the axis.

8. The vehicle lamp assembly as recited in claim 1, wherein the vent opening is at least as large as the connector.

9. A process for reflashing a vehicle lamp assembly comprising:
    assembling a lamp housing to include a vent opening disposed about an axis and assembling a circuit board into the lamp housing such that a connector on the circuit board is disposed on the axis;
    extending a reflashing tool through the vent opening formed in the lamp housing;
    connecting the reflashing tool to the connector on the circuit board disposed within the lamp housing;
    reflashing a controller on the circuit board through a communication link established through the connection of the reflashing tool and the connector;
    removing the reflashing tool upon completion of the reflashing; and
    assembling a permeable membrane over the vent opening.

10. The process for reflashing a vehicle lamp assembly as recited in claim 9, further comprising removing an originally installed first permeable membrane disposed over the vent opening of the lamp housing prior to extending the reflashing tool through the vent opening.

11. The process for reflashing a vehicle lamp assembly as recited in claim 10, further comprising assembling the lamp housing to include the vent opening disposed about an axis and assembling the circuit board into the lamp housing such that the connector on the circuit board is disposed along the axis.

12. The process for reflashing a vehicle lamp assembly as recited in claim 9, wherein assembly of the circuit board into the lamp housing includes assembling the connector to be transverse to the axis.

13. The process for reflashing a vehicle lamp assembly as recited in claim 11, wherein assembling the lamp housing to include the vent opening disposed about the axis further comprises forming the vent opening to be one of a rectilinear shape or a curvilinear shape.

14. The process for reflashing a vehicle lamp assembly as recited in claim 11, wherein assembling the lamp housing to include the vent opening disposed about the axis further comprises forming the vent opening to be asymmetrical about the axis.

15. The process for reflashing a vehicle lamp assembly as recited in claim 9, further comprising performing a diagnostic of lamp operation prior to reflashing the controller.

16. The process for reflashing a vehicle lamp assembly as recited in claim 9, wherein reflashing the controller comprises reprogramming functions of the lamp assembly.

17. A vehicle lamp assembly comprising:
- a lamp housing defining an interior cavity and an exterior surface;
- a circuit board disposed within the interior cavity, the circuit board including a memory device, microprocessor and a connector for establishing a communication link with the memory device and the microprocessor;
- a vent opening within the lamp housing, the vent opening and the connector are disposed on a common axis that extends through the vent opening to the connector, wherein a space between the vent opening and the connector within the lamp housing is unobstructed; and
- a permeable membrane is attached over the vent opening.

18. The vehicle lamp assembly as recited in claim 17, wherein the vent opening is disposed along the exterior surface of the lamp housing.

19. The vehicle lamp assembly as recited in claim 18, wherein the connector is disposed transverse to the common axis.

20. The vehicle lamp assembly as recited in claim 19, wherein the connector comprises a plurality of pins that extend from the circuit board, the pins extending from the circuit board along the axis.

\* \* \* \* \*

UNITED STATES PATENT AND TRADEMARK OFFICE
CERTIFICATE OF CORRECTION

PATENT NO. : 11,002,422 B1
APPLICATION NO. : 16/774346
DATED : May 11, 2021
INVENTOR(S) : Aaron Bradley Johnson et al.

Page 1 of 1

It is certified that error appears in the above-identified patent and that said Letters Patent is hereby corrected as shown below:

In the Claims

In Claim 3, Column 6, Line 20; replace "the light housing" with --the lamp housing--

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*